US005157079A

United States Patent [19]

Duck et al.

[11] Patent Number: 5,157,079

[45] Date of Patent: Oct. 20, 1992

[54] EPOXIDIZED NATURAL RUBBER WITH EPOXY RESIN AND TRIALKOXYSILYL GROUP-CONTAINING POLYAMINE OR POLYMERCAPTAN

[75] Inventors: Edward W. Duck, Leimen-Gauangelloch; Karl Reich, Carlsberg; Norman Blank, Heidelberg, all of Fed. Rep. of Germany

[73] Assignee: Teroson GmbH, Heidelberg, Fed. Rep. of Germany

[21] Appl. No.: 668,342

[22] Filed: Mar. 8, 1991

Related U.S. Application Data

[63] Continuation of Ser. No. 307,137, Feb. 6, 1989, abandoned, which is a continuation of Ser. No. 13,093, May 5, 1987, abandoned.

[30] Foreign Application Priority Data

Feb. 12, 1986 [DE] Fed. Rep. of Germany ....... 3604278

[51] Int. Cl.[5] ........................ C08L 7/00; C08L 63/02; C08L 63/04

[52] U.S. Cl. .................................... 525/113; 525/107; 525/122

[58] Field of Search ........................ 525/113, 122, 107

[56] References Cited

U.S. PATENT DOCUMENTS

| | | | |
|---|---|---|---|
| 2,971,864 | 2/1961 | Speier | 528/38 |
| 4,169,822 | 10/1979 | Kutch et al. | 525/122 |
| 4,179,537 | 12/1979 | Rykowski | 427/333 |
| 4,328,277 | 5/1982 | Molari, Jr. | 428/412 |
| 4,369,222 | 1/1983 | Hedrick et al. | 428/447 |
| 4,416,923 | 11/1983 | Murase | 427/387 |
| 4,444,936 | 4/1984 | Schwarz et al. | 525/262 |
| 4,463,129 | 7/1984 | Shinada et al. | 525/122 |

*Primary Examiner*—Robert E. Sellers
*Attorney, Agent, or Firm*—Ernest J. Szoke; Wayne C. Jaeschke; Valerie E. Looper

[57] ABSTRACT

The invention is directed to a process for preparing a sealant and adhesive useful, e.g., in double glazing systems. The sealant comprises 20–80 weight percent epoxidized natural rubber, 5–30 weight percent of at least one further epoxy compound, and, as a crosslinking agent, a polyamine or polymercaptan carrying trialkoxysilyl groups. The crosslinking agent is incorporated into the epoxidized natural rubber in one step.

11 Claims, No Drawings

EPOXIDIZED NATURAL RUBBER WITH EPOXY RESIN AND TRIALKOXYSILYL GROUP-CONTAINING POLYAMINE OR POLYMERCAPTAN

This is a continuation of application Ser. No. 307,137, filed Feb. 6, 1989, which is a continuation of application Ser. No. 013,093, filed May 5, 1987, both now abandoned.

The invention relates to sealants and adhesives, such as are in particular required in the manufacture of double glazing systems.

Due to its many advantages, double glazing is widely used in building. Particular reference is made to the improved sound and thermal insulation compared with single glazing.

In commercially available double glazing systems rigid spacers ensure the desired spacing between the glass plates. The spacers are positioned in the vicinity of the edges of the glass plates, so that the spacers together with the edge regions of the plates form an outwardly directed channel for receiving sealants and adhesives. Generally the spacers are hollow and have small openings in the direction of the dead air gap between the glass plates. The gap of the spacers is used for receiving a drying agent for absorbing moisture and solvent residues in the air gap between the glass plates. This ensures that in the case of low ambient temperatures, the double glazing system does not become moisture coated from the inside. The spacer is normally an aluminium section.

Two differnt methods are used for the durable connection of the aforementioned arrangement and these are called the single system and the double system.

In order to produce a single system, a thermoplastic sealing compound or so-called hot melt is introduced in the hot state into the outwardly directed all-round channel of the system. On cooling the sealing compound hardens and ensures a more or less durable adhesive connection of the plates. The sealant also has the function of preventing moisture from penetrating into the air gap between the glass plates. As the wetting of the glass plates by the sealant in the softened state is incomplete, this method only leads to low to medium strengths of the double glazing system.

Much higher strength characteristics are obtained with the double system. During the production thereof a reactive adhesive is also poured into the channel and initially in the non-crosslinked state it ensures a much better wetting of the glass surface whilst, in the wetted state and together with the sealant previously applied to the metal section, it ensures an adequate structural strength.

For producing the single system, use is mainly made of formulations based on polyisobutylene or butyl rubber. When producing the double system, it is conventional practice to additionally use a two-component adhesive with a polysulphide or polyurethane base.

It is comparatively simpler to produce the single system, so that such double glazing systems are less expensive. However, it is then necessary to accept serious disadvantages. As has already been mentioned, the sealant only has a low to moderate adhesion to the glass plates, whilst there is additionally a marked creeping tendency at ambient temperature, which is called cold flow. As a result, particularly when heated by solar radiation, the sealant slowly flows out of the channel or joint.

It is much more complicated to produce a double system, because it involves an additional operation for using the adhesive, so that such systems are much more expensive.

Numerous proposals have been made for improving the inexpensive single systems. However, it has hitherto not proved possible to provide a high quality sealant, which is able to give an adequate structural strength to a single system.

DE-OS 24 24 264 describes a window arrangement with a sealing compound, which essentially comprises approximately 20 to 100 parts by weight of an elastic polymer, 15 to 150 parts by weight of plasticizing and bonding resins, 0 to 44 parts by weight of adhesion accelerators and 0 to 150 parts by weight of fillers and pigments. The elastic polymer can be an isobutylene - isoprene copolymer, a polyisobutylene, a styrene - butadiene copolymer, a styrene - isoprene copolymer, a chlorinated rubber or a solid polysulphide polymer.

U.S. Pat. No. 4,169,822 describes a thermoplastic sealant and adhesive, which essentially comprises a mixture of 100 parts by weight of a polymeric elastomeric compound, 1 to 400 parts by weight of tackifying resins, 15 to 600 parts by weight of plasticizer, 0.5 to 60 parts by weight of adhesion improving agents and 5 to 1000 parts by weight of an inert filler. The elastomeric compound can be a polyisobutylene, a butadiene - styrene copolymer, a styrene - butadiene - styrene copolymer, a styrene - isoprene copolymer, a chlorinated rubber, an acrylic rubber or a mixture thereof.

FR-OS 2 486 065 describes a process for bonding glass with different materials, in which a separate coupling agent is used apart from a sealant. Sealants are used, which contain a polyisobutylene, a high molecular weight isobutylene - isoprene copolymer or a vulcanizable, low molecular weight isobutylene - isoprene copolymer.

EP-OS 0 109 954 describes a thermoplastic adhesive composition containing rubber and an adhesive resin miscible therewith and which is called a copolyether ester amide.

Of the aforementioned sealants, those based on copolymers of isobutylene and isoprene have been most widely used. However, these sealants suffer from the disadvantage that they have a marked flow tendency just above ambient temperature, which has a marked disadvantageous effect on maintaining shape. If an attempt is made to compensate this tendency by higher crosslinking, then there is a drastic reduction of the adhesion to the glass surface.

Since in the case of double glazing systems, it is necessary to have an extremely low water vapour permeability of the sealant, it has proved necessary to use non-polar materials of the butyl rubber type. On the basis of these materials, attempts have been made to directly form a crosslinked sealant in the sealant joint. For this purpose, a hardener was added to the sealant just prior to processing. In theory, this procedure offers the advantage that the surface adhesion is improved by better wetting of the glass surface in the non-crosslinked state. However, sealants of this type have not become commercially successful due to through-curing problems. A survey concerning this question is provided by L. A. Strecker, Adhesives Age, 1975, (18), 11, pp. 29–35. It is the very non-polar nature of the known sealants, which gives them the desirable property of non-permeability for polar gases and particularly water vapour, which is simultaneously the cause of the main disadvantage thereof, namely the limited affinity to such polar materials as glass and metal. According to the aforementioned U.S. Pat. No. 4,169,822, attempts have been made to counteract this problem by adding to the sealant a coupling agent, which contains an epoxy resin and an organic silane, which does not react with the epoxy resin. However, as there are no functional groups which could react with the coupling agent components, there is not true chemical bond between the sealant and the glass surface, so that the water resistance of such sealed double glazing systems is unsatisfactory.

Finally, Brazilian patent application 83 02 984 describes an adhesive, which contains partially oxidized natural rubber, which is hardened with compounds having several active hydrogen atoms. According thereto, natural rubber is initially mechanically comminuted, then dissolved in toluene and epoxidized by the action of hydrogen peroxide in the presence of acetic acid and sulphuric acid. The product is then mixed with a 10% solution of triethylene tetramine in chloroform and applied to aluminium sheets. Good adhesion is obtained by hardening for 15 minutes under pressure at 100° C.

The object of the present invention is to provide an improved sealant and adhesive composition which in particular permits a significant simplification of the manufacture of double glazing systems. As a result of its characteristics, the adhesive to be provided by the invention must not only permit the production of single systems with an adequate strength, but also and in particular the production of spacer-free double glazing systems. To this end, the adhesive to be provided according to the invention must on the one hand have a very high water vapour permeability and on the other must adequately adhere to glass, so that there is no need to use a separate adhesive. Finally, according to the invention, the mechanical characteristics of the sealant and adhesive must make it possible to obviate the need for a rigid spacer in a double glazing system.

According to the invention, this problem is solved by a sealant and adhesive composition comprising 20 to 80% by weight of epoxidized natural rubber, 5 to 30% by weight of at least one further epoxy compound and a polyamine or polymercaptan carrying trialkoxysilyl groups as the crosslinking agent.

It has surprisingly been found that sealant formulations, which are based on epoxidized natural rubber, do not suffer from the disadvantages of the known sealants and are eminently suitable for the production of spacer-free double glazing systems.

Unmodified natural rubber has an excessively high gas permeability for sealants. However, it is found that the gas permeability drops with an increasing epoxy group content. If approximately 50% of the double bonds present in the natural rubber are epoxidized, then there is only a minimum gas permeability of the material. The gas permeability rises again with a higher degree of epoxidation. Hitherto non-polar butyl rubber has been the elastomer with the lowest permeability for gases. Despite the high proportion of polar epoxy groups, natural rubber with a degree of epoxidation of 50% has just as low a gas permeability as butyl rubber (cf. C. S. L. Baker, I. R. Gelling, R. Newel, Gummi Fasern Kunststoffe, vol. 38, (1985), 8, pp. 410–419).

The 50% epoxidized natural rubber is a polymer built up from units of formula I

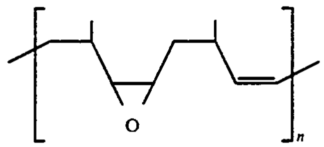

It is surprising that through the epoxidation of the natural rubber, the water vapour permeability is also drastically reduced. It would have been expected that the introduction of oxiran rings and also to a limited extent hydroxyl groups would favour water vapour diffusion through the material.

It is also surprising that through the reaction of epoxidized natural rubber with a suitable crosslinking agent with free primary and secondary amino groups a crosslinked elastomer is obtained, which has no flow tendency and whose water vapour permeability is still like that of butyl rubber.

The presence of a relatively large number of epoxy and optionally hydroxy groups in the sealant according to the invention makes it possible, when using suitable coupling agents, to form a true chemical bond between the sealant and the glass surface. This effectively prevents in a double glazing system the penetration of moisture along the interface between the sealant and the glass, which in the case of known sealants is frequently linked with partial or complete delamination.

A further advantage of the invention is obtained through the marked crosslinking of the sealant. Such a good structural strength is obtained that when using the sealant in a double glazing system, there is no need for the conventional aluminium section as a spacer, which leads to considerable material and labour cost savings.

The advantages according to the invention are obtained through the combination of an epoxidized natural rubber and further epoxy compounds from the class of epoxy resins and with polyfunctional crosslinking agents, which carry both primary and secondary amino groups or mercapto groups, as well as trialkoxysilyl groups.

Epoxidized natural rubber can easily be obtained by epoxidizing natural rubber latex. This material is commercially available from Malaysian rubber producers under the designations ENR 50 and ENR 25 in the form of dehydrated bales. It is inexpensive compared with other completely synthetic diene elastomers. As a result of its favourable characteristics, it is eminently suitable for use in the sealants according to the invention.

For comparison purposes, tests were carried out with other epoxidized diene elastomers, e.g. with synthetic cis-1,4-polyisoprene, which has a similar structure to natural rubber, cis-1,4-polybutadiene, 1,2-polybutadiene or their copolymers with styrene, as well as with epoxidized triblock copolymers based on styrene - cis-1,4-butadiene-styrene or styrene - cis-1,4-isoprene - styrene. In these tests, there were either difficulties during epoxidation or it was found that the sealants obtained on the basis of these diene elastomers did not have the same favourable properties as those based on epoxidized natural rubber. In addition, it is uneconomic to use these fully synthetic diene elastomers due to their high cost.

Commercially available epoxidized natural rubber is produced by a process in which the natural rubber is epoxidized as an aqueous latex. This procedure is much more favourable than the epoxidation in toluene mentioned in Brazilian patent application 83 02 984 which, due to the use of the solvent, is complicated and expensive and leads to lower grade products, because it is only incompletely possible to remove the solvent.

The epoxidized natural rubber obtained by the epoxidation of aqueous latex contains considerable gel proportions and these could lead to the sealant formulations produced therefrom being inhomogeneous. Although it was to be feared that through the action of shear forces at elevated temperature there would be a crosslinking by opening the oxiran rings, it was surprisingly found that a homogenization of the material at elevated temperature is both possible and appropriate. This leads to a material with a reduced viscosity, which is completely soluble in many technical solvents and supplies completely homogeneous sealant formulations. Unlike other elastomers, the material obtained by such a mastication process does not contain readily volatile constituents. With regards to double glazing systems, this has the further advantage that no undesired moisture coatings can form on the glass plates, i.e. so-called fogging. According to a preferred procedure according to the invention, the epoxidized natural rubber is masticated for 20 minutes at 120° C. in a masticator which builds up high shear forces.

Apart from epoxidized natural rubber, the sealants and adhesives according to the invention contain further similar epoxy compounds from the class of epoxy resins. These compounds control the crosslinking density and therefore the modulus of elasticity of the sealing compound, whilst also positively influencing the glass adhesion.

In principle, any random epoxy resin can be incorporated into epoxidized natural rubber, provided that it is adequately miscible therewith in the heat, i.e. gives a homogeneous mixture. It is possible to use aliphatic and/or aromatic epoxy resins, whose molar mass is in the range of approximately 200 to approximately 2000. Preference is given to aromatic glycidyl ethers in the case of the sealant and adhesive compositions of the invention to be used in the production. of double glazing systems. Particular preference among these is given to bisphenol F-diglycidyl ethers, bisphenol F-diglycidyl ethers, glycidyl ethers of novolak resins and mixtures thereof.

The bisphenol diglycidyl ethers usable according to the invention are understood to mean compounds of formula II

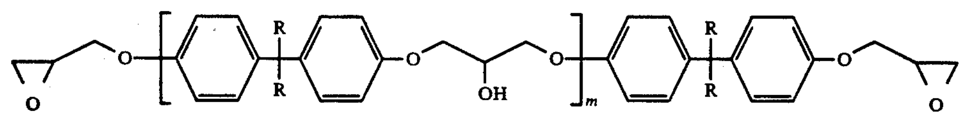

in which R is a hydrogen atom or methyl group and m is an integer from 0 to 5.

The glycidyl ethers of novolak resins usable according to the invention are understood to mean compounds of formula III

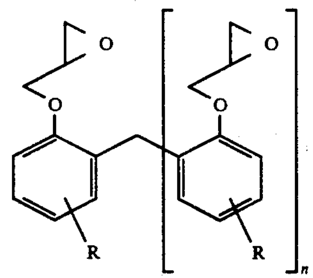

in which R has the aforementioned meaning and n is an integer between 1 and 4.

As has already been stated, it is indispensable for the formation of a durable seal in a double glazing system for a chemical bond to form between glass and sealant, which is stable against hydrolysis. The prerequisites for this are on the one hand an adequate wetting of the glass surface by the sealant and on the other the presence of reactive groups, which can react with the very polar glass surface. As an adequate structural strength is required of the sealant, it must be appropriately crosslinked following application. The behaviour in the cold, which is described by the glass transition temperature $T_g$, only changes to a small extent. However, a significant improvement to the strength at elevated temperatures up to approximately 80° C. is obtained. Therefore the sealant is in a position to withstand the mechanical stresses which occur without permanent deformation. For example, in the case of a double glazing system, the following mechanical stresses occur:

1. cyclic load changes as a result of temperature changes, caused on the one hand by differing length changes of the participating components and on the other by the pressure change within the system;
2. static loads, which result from the weight of the glass plate.

The sealant and adhesive according to the invention is able to fully satisfy the above requirements and this is greatly helped by the crosslinking agents used according to the invention.

It has long been known that polyamines and polyamino amides are good hardeners for epoxy adhesives and are particularly suitable for curing at ambient temperature. However, their high hardening speed desired for this purpose limits the processing time to approximately 15 to 60 minutes. The sealants cured with simple polyamines and polyamino amides suffer from the disadvantage that the joints produced with them adhesively fail and do not have the desired cohesive breaking behaviour. The cross-linking agents used according to the invention differ from the aforementioned hardeners in that, apart from amino groups, they contain an adequate number of alkoxysilyl groups. Preference is given according to the invention to polyamines and polyamino amides having in each case at least one primary and one secondary amino group, as well as at least one trialkoxysilyl group. These compounds can be obtained from the corresponding polyamines by reacting with 3-chloropropyl trialkoxysilanes. This reaction is described in U.S. Pat. No. 2,971,864, which is hereby made into part of the present description.

Examples of the crosslinking agents usable according to the invention are compounds obtainable by substituting hydrogen atoms of amino groups by trialkoxysilyl propyl groups from the following polyamines: 1,2-diaminoethane, 1,3-diamino-n-propane, 1,4-diamino-n-butane, 1,6-diamino-n-hexane, diethylenetriamine, triethylene tetramine, polyamide of dimeric fatty acid and hexamethylene diamine containing terminal amino groups and polyamide of dimeric fatty acid and diethylenetriamine containing terminal amino groups.

The preferred crosslinking agents according to the invention are polyamines carrying trialkoxysilyl groups of formulas IVa, IVb, IVc

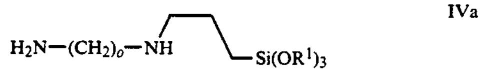

IVa in which $R^1$ designates $C_1$ to $C_4$-alkyl radicals, which can be the same or different, and o stands for an integer between 2 and 6

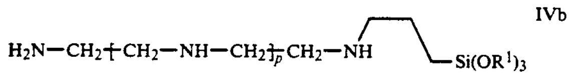

IVb in which $R^1$ has the above meaning and p is 1 or 2

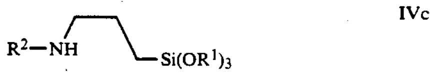

IVc in which $R^1$ has the above meaning and $R^2$ stands for a polyamino amide unit having 1 or 2 amino groups.

Another possibility for curing epoxy adhesives is provided by the use of polymercaptans, which has also long been known to the expert. As a result of the high nucleophilicity of the mercapto groups, these lead to an easy opening of the oxiran ring, which brings about the crosslinking of the epoxy resin chains at ambient temperature. The already fast reaction can be further accelerated by adding amines, but this is not desirable in all applications.

With regard to the sealants and adhesives according to the invention, it has been found that polymercaptans are also eminently suitable for crosslinking formulations containing epoxidized natural rubber. Here again the incorporation of trialkoxysilyl groups into the crosslinking agent molecule ensures the desired cohesive behavior.

Preferred crosslinking agents from the polymercaptans carrying trialkoxysilyl groups are therefore compounds of formula V

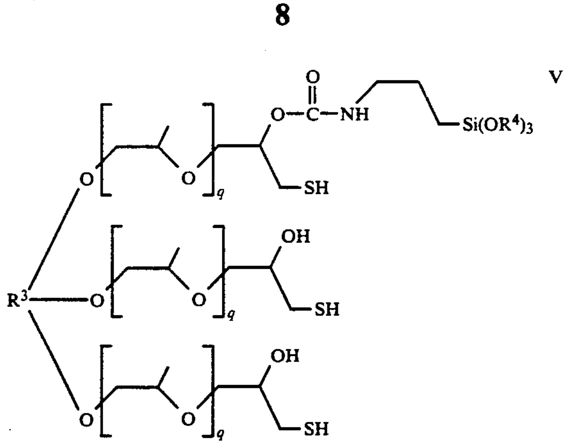

V in which R designates $C_1$–$C_4$-alkyl radicals, which can be the same or different, $R^3$ designates an aliphatic hydrocarbon radical and q can assume the values 1 and 2.

Such compounds can be obtained from the corresponding trifunctional mercaptan with unsubstituted OH-groups, which is marketed by Diamond Shamrock under the trade name Capcure 3-800, by simple reaction with 3-isocyanatopropyl-trialkoxysilane in the presence of tin catalysts, such as e.g. dibutyl tin dilaurate. A reaction with low molecular weight polymercaptans is not possible due to the intolerable odor of these relatively readily volatile products for the desired application.

It is advantageous to incorporate into the sealant formulations according to the invention, further additives which optimize the characteristics of the sealant, particularly with a view to use for sealing double glazing systems. Polymers with a good glass adhesion, such as ethylene - vinyl acetate copolymers, polyvinylbutyral, polyether polyamides or polyester polyamides are useful for the purpose of improving adhesion. However, these substances only improve adhesion through physical interaction and must therefore be differentiated from those agents bringing about an anchoring to the surface by chemical reaction, such as trialkoxysilyl propyl-substituted polyamines or polymercaptans used as crosslinking agents.

In addition, it is possible to add to the sealant formulations according to the invention further alkoxysilyl compounds, e.g. 3-(dimethylamino)-propyl trimethoxysilane, 3-mercaptopropyl-trimethoxy silane or 3-glycidyloxypropyl-trimethoxy silane. These compounds increase adhesion less than the crosslinking agents according to the invention, but are cheaper to produce.

Tackifying agents are used to give the sealing compounds increased surface tackiness during application to the glass at approximately 100° C. and therefore give a better initial adhesion. Examples are phenol-terpene resins, cyclopentadiene resins, hydrogenated rosin esters and synthetic hydrocarbon resins.

For plasticizing the sealants and improving their processing, plasticizers are incorporated and for this purpose mainly low molecular weight polyisobutylenes and polybutylenes are used.

Suitable fillers for improving the mechanical characteristics of the sealants are so-called active or reinforcing fillers, such as the various carbon black types or pyrogenic silicas.

In order to reduce the harmful influence of UV-radiation on the sealants, ageing and UV-protection agents can be added. However, in the case of carbon black-filled sealants, this addition is not generally necessary, because carbon black in itself has an excellent stabilizing action. Whilst the addition of sterically hindered phenols has proved advantageous against radical decomposition, the addition of UV-stabilizers is recommended to protect against UV-radiation. Examples are oxalic anilides, hydroxybenzotriazoles and sterically hindered piperidine derivatives.

The preparation of the sealant formulations according to the invention can take place by simple compounding in a suitable masticator. During the following incorporation of the amino group-containing or mercaptan group-containing crosslinking agent, it must be ensured that the temperature is no higher than approximately 40° C., so that there is no sealant crosslinking prior to use.

The best results regarding glass adhesion and durability of the resulting bond are obtained if the sealant is applied to the glass surface immediately after its preparation. Thus, according to the invention, the sealant is preferably prepared directly prior to use from two premixed components. One component contains the epoxidized natural rubber, the further epoxy compounds, the adhesion improving agents not reacting with the epoxy groups, the ageing and UV-protection agents and part of the fillers. The other component contains the crosslinking agent, further coupling agents, tackifying agents, plasticizers and the remainder of the fillers. An efficient mixing of these components prior to application to the glass can be brought about by a suitable twin-screw extruder. The two components have an adequate storage stability.

The invention is described in greater detail hereinafter relative to examples describing different sealant formulations and their physical characteristics. The following characteristics are particularly important for using sealants for sealing double glazing systems.

1. Water vapour permeability
2. Adhesion to glass and tensile strength of the glass/glass bond as a function of elongation or extension
3. Creeping tendency under static load
4. Resistance of the glass/glass bond to water under normal and elevated temperature and to UV-radiation.

In order to investigate these four groups of characteristics, the following testing methods are used.

1. The determination of the water vapour permeability of the sealants took place on 1.5 mm thick sheets. The latter were obtained by means of a heatable press, by pressing the particular sealant between plates coated with polytetrafluoroethylene (PTFE). Circular sheets with a diameter of 105 mm were placed in a test apparatus, obtainable from Messrs. Lyssy under the type designation L80. The value obtained for the water vapour permeability is given in $g/m^2/24$ hours.
2. For testing the adhesion to glass and tensile strength, a profile with a square cross-section of 10×10 mm was extruded from the sealants according to the invention at 60° C. A 50 mm long piece of this profile was centrally applied to a degreased, square glass plate with a thickness of 5 mm and an edge length of 50 mm parallel to one of the edges. A second glass plate was placed over it. Spacers were inserted on the outsides of the glass plates and the latter were pre-pressed to a spacing of 8 mm by means of suitable clips or clamps.

The arrangement was heated for 15 minutes at 120° C. in a heating cabinet in order to ensure an adequate wetting. Following a cooling time of 30 minutes, the spacers were removed and the arrangement was stored for 7 days under normal climatic conditions 23/50-1 according to DIN 50514. The test pieces were then stretched by means of suitable supporting devices in an Instron tensile testing machine and the tensile strength was determined at a pulling rate of 10 mm/minute. Simultaneously the elongation at break was determined and established whether the break occurred in the actual sealant, i.e. cohesively, or at the interface between sealant and glass, i.e. adhesively.
3. For determining the creeping tendency under static load an overlap bond of glass plates was produced in the manner described hereinbefore.

Use was made of 5 mm thick glass plates with a length of 100 mm and a width of 25 mm. The arrangement was vertically suspended and loaded with a weight of 150 g. To determine the static load resistance, the displacement of the loaded glass plate compared with the immovably fixed glass plate was determined after 6 hours at temperature of 20° and 60° C.
4. To determine the behaviour of sealants to the simultaneous action of water and UV-radiation, test bodies as described in 2 were exposed for 1000 hours to intense UV-radiation under water at 23° C. They were then dried at ambient temperature and subsequently the tensile strength was determined. In a further test, the test pieces were stored for two weeks at 60° C. and 100% relative atmospheric humidity. The remaining tensile strength and breaking behaviour were then determined.

COMPARISON EXAMPLE

In order to illustrate the difference between the sealants according to the invention and conventional hot melt sealants based on butyl rubber (isobutylene - isoprene rubber), a formulation as described in DE-OS 24 24 264 was prepared for comparison purposes. The following constituents were used:

| Chemical Composition | Trade Name | Proportion |
|---|---|---|
| Isobutylene - isoprene copolymer | (EX 214) | 28.00% by weight |
| Bisphenol A-diglycidyl ether | (Epikote 828) | 5.00% by weight |
| Polybutylene | (Indopol 1900) | 35.50% by weight |
| Polyterpene resin | (Wing Tack 95) | 20.00% by weight |
| Furnace black | (Printex 80) | 8.00% by weight |
| 3-(2-aminoethylamino)-propyl trimethoxysilane | (Damo) | 3.00% by weight |
| Stearic acid | | 0.50% by weight |

The weakly crosslinked isobutylene - isoprene copolymer, the stearic acid and the polyterpene resin were masticated for 5 minutes at 100° C. and 60 r.p.m. in a thermostatically controlled Brabender cam masticator N 50 H, equipped for vacuum operation. When the mixture was homogeneous, the polybutylene and bisphenol A-diglycidyl ether were introduced and homogenized. After incorporating the furnace black, further mastication took place for 10 minutes at 100° C. and with 60 r.p.m. until once again a homogeneous mixture was produced. This was followed by cooling to 40° C. and the incorporation of the 3-(2-aminoethylamino)-propyl trimethoxysilane. After masticating for 5 minutes at 40° C. and 30 r.p.m. under a vacuum of 10 hPa, the sealant was removed from the masticator and extruded through a suitable die by means of a Brabender extruder 10 DW at 100° C., giving a profile with a square cross-section of 10×10 mm.

EXAMPLE 1

A sealant formulation according to the invention was prepared from the following constituents:

| Chemical Composition | Trade Name | Example 1 |
|---|---|---|
| Epoxidized natural rubber | (ENR 50) | 48.00% by weight |
| Bisphenol A-diglycidyl ether | (Epikote 828) | 20.00% by weight |
| Polyisobutylene | (Oppanol B 15) | 10.00% by weight |
| Polyterpene resin | (Wing Tack 95) | 10.00% by weight |
| Furnace black | (Printex 80) | 8.00% by weight |
| 3-(2-aminoethylamino)-propyl trimethoxysilane | (Damo) | 4.00% by weight |

Epoxidized natural rubber with a 50% degree of epoxidation was masticated in a thermostatically controlled Brabender roller masticator W30H at 120° C. and 150 r.p.m. until the elastomer revealed no viscosity drop apparent from the torque curve. The material obtained was gel-free and was soluble in toluene and chloroform without leaving a residue.

The polyterpene resin, polyisobutylene, bisphenol A-diglycidyl ether and furnace black were incorporated into the thus masticated natural rubber by masticating at 100° C. and 60 r.p.m. in a thermostatically controlled Brabender cam masticator N50H equipped for vacuum operation. Approximately 20 minutes were necessary for homogenizing the mixture, which was then cooled to 40° C. The 3-(2-aminoethylamino)-propyl trimethoxysilane was incorporated. Degassing took place under a vacuum of 10 hPa at 40° C. and 30 r.p.m. The sealant was removed from the masticator and extruded through a suitable die by means of a Brabender extruder 10DW at 60° C., a profile with a square cross-section of 10×10 mm being obtained.

The characteristics of the thus produced sealant were tested in the manner described hereinbefore. The sealant obtained in the comparison example was tested under identical conditions. The results obtained for both materials are compared in the following table 1.

| Characteristic | Comparison Example | Example 1 |
|---|---|---|
| Water vapour permeability ($g\ m^{-2}d^{-1}$) | 0.18 | 0.23 |
| Tensile strength of the glass-glass bond ($N\ cm^{-2}$) | 23 a | 99 k |
| Elongation at break (%) | 87 | 94 |
| Creep tendency under load | | |
| at 23° C. (mm) | 6.0 | 1.5 |
| at 60° C. (mm) | Failed | 4.5 |
| Tensile strength after weathering ($N\ cm^{-2}$) | | |
| 1000 h water + UV | 14 a | 91 k |
| 2 weeks at 60° C. + 100% relative humidity | 8 a | 104 k |

a = adhesive breaking behaviour
k = cohesive breaking behaviour

As is apparent from table 1, the sealant according to example 1 has much better characteristics than the sealant of the comparison example. Whereas the water vapour permeability is roughly at the same level, the glass adhesion of the sealant according to the invention is much better and also has the desired cohesive breaking behaviour. As a result of the crosslinking of the sealant formulation according to the invention, even at elevated temperature, the creeping tendency remains very low. The sealant according to the invention also has a much better resistance to moisture, heat and ultraviolet radiation.

EXAMPLES 2 TO 4

These examples investigated the influence of the degree of epoxidation of the natural rubber, the proportion of epoxidized natural rubber and the proportion of additional epoxy resins in the sealant formulation. The sealants were prepared in the manner described in example 1 from the components given in table 2.

TABLE 2

| Component | Proportion (% by weight) Example 2 | Example 3 | Example 4 |
|---|---|---|---|
| Epoxidized natural rubber (ENR 25) 25% of the double bonds epoxidized | 48.00 | — | — |
| Epoxidized natural rubber (ENR 50) 50% of the double bonds epoxidized | — | 40.00 | 32.00 |
| Polyisobutylene (Oppanol B 15) | 10.00 | 10.00 | 10.00 |
| Polyterpene resin (Wing Tack 95) | 10.00 | 10.00 | 10.00 |
| Bisphenol A-diglycidyl ether (Epikote 828) | 20.00 | 26.00 | 30.00 |
| Furnace black (Printex 80) | 8.00 | 8.00 | 8.00 |
| 3-(2-aminoethylamino)-propyl trimethoxysilane (Damo) | 4.00 | 6.00 | 10.00 |

The sealants obtained according to these examples were again tested in the aforementioned manner and the results are given in table 3.

TABLE 3

| | Example 2 | Example 3 | Example 4 |
|---|---|---|---|
| Tensile strength ($N\ cm^{-2}$) | 30 | 151 | 161 |
| Elongation at break (%) | 112 | 34 | 16 |
| Breaking behaviour | Cohesive | Cohesive | Cohesive |

As is shown in example 2, a reduction of the degree of epoxidation of the natural rubber from 50 to 25% in the otherwise unchanged sealant composition led to a clear reduction in the tensile strength on glass, without any significant influence on the elongation at break. Examples 3 and 4 show that a reduction in the epoxidized natural rubber content, accompanied by an increase in the epoxy resin content significantly increases glass adhesion compared with example 1, whilst the sealant hardness is also increased. These examples show that the characteristics of the sealant according to the invention can be very well adapted to the intended use.

EXAMPLES 5 AND 6

In the manner described in example 1, sealants were prepared from the components given in table 4.

TABLE 4

| Component | Proportion (% by weight) Example 5 | Example 6 |
|---|---|---|
| Epoxidized natural rubber (ENR 50) 50% of the double bonds epoxidized | 48.00 | 48.00 |
| Polyisobutylene (Oppanol B 15) | 10.00 | 10.00 |
| Polyterpene resin (Wing Tack 95) | 10.00 | 10.00 |

TABLE 4-continued

| Component | Proportion (% by weight) Example 5 | Example 6 |
|---|---|---|
| Epoxy compound (Epikote 1002) | 20.00 | — |
| Epoxy compound (DEN 438) | — | 20.00 |
| Furnace black (Printex 80) | 8.00 | 8.00 |
| 3-(2-aminoethylamino)-propyl trimethoxysilane (Damo) | 4.00 | 4.00 |

The glass adhesion of the sealants obtained was investigated in the aforementioned manner and the results are given in table 5.

TABLE 5

| | Example 5 | Example 6 |
|---|---|---|
| Tensile strength (N $cm^{-2}$) | 133 | 105 |
| Elongation at break (%) | 37 | 53 |
| Breaking behaviour | Cohesive | Cohesive |

These examples show the influence of the use of additional epoxy compounds on the characteristics of the sealants according to the invention.

EXAMPLES 7 TO 9

Sealants were prepared from the components given in table 6 in the manner described in example 1.

TABLE 6

| Component | Proportion (% by weight) Example 7 | Example 8 | Example 9 |
|---|---|---|---|
| Epoxidized natural rubber (ENR 50) 50% of the double bonds epoxidized | 42.00 | 42.00 | 42.00 |
| Polyisobutylene (Oppanol B 15) | 10.00 | 10.00 | 10.00 |
| Polyterpene resin (Wing Tack 95) | 10.00 | 10.00 | 10.00 |
| Furnace black (Printex 80) | 8.00 | 8.00 | 8.00 |
| Epoxy resin (Epikote 828) | 20.00 | 20.00 | 20.00 |
| Reaction product of hexamethylene diamine and 3-chloropropyl trimethoxysilane | 10.00 | — | — |
| Reaction product of a polyamino amide (Versamid 125) and 3-chloropropyl trimethoxysilane | — | 10.00 | — |
| Reaction product of a poly-mercaptan (Capcure 3-800) and 3-isocyanato propyl trimethoxysilane | — | — | 10.00 |

Once again the glass adhesion was investigated in the aforementioned manner and the results are given in table 7.

TABLE 7

| | Example 7 | Example 8 | Example 9 |
|---|---|---|---|
| Tensile strength (N $cm^{-2}$) | 93 | 87 | — |
| Elongation at break (%) | 142 | 192 | — |
| Breaking behaviour | Cohesive | Cohesive | Cohesive |

— not measured.

These examples show the influence of a change to the crosslinking agent on the characteristics of the sealants according to the invention. Compared with the preceding examples, it can be seen that the choice of crosslinking agent does not significantly influence the tensile strength. However, the choice of crosslinking agent can lead to a lasting change to the elongation at break and hardness of the sealant. It is possible in this way to adapt the characteristics of the sealant according to the invention in a planned manner to the intended use.

EXAMPLE 10

This example describes the use of the sealant formulation according to the invention as a two-component system. From the following constituents, a component A and a component B were prepared.

| | Proportion (% by weight) |
|---|---|
| Component A | |
| Epoxidized natural rubber (ENR 50) 50% of the double bonds epoxidized | 48.00 |
| Bisphenol A-diglycidyl ether (Epikote 828) | 20.00 |
| Furnace black (Printex 80) | 4.00 |
| Component B | |
| Polyisobutylene (Oppanol B 15) | 10.00 |
| Polyterpene resin (Wing Tack 95) | 10.00 |
| Furnace black (Printex 80) | 4.00 |
| 3-(2-aminoethylamino)-propyl trimethoxysilane (Damo) | 4.00 |

The bisphenol A-diglycidyl ether and furnace black were incorporated into the epoxidized natural rubber masticated according to example 1 by masticating at 100° C. and 60 r.p.m. in a Brabender cam masticator N 50H equipped for vacuum operation. Ten minutes were required for homogenization purposes. The thus prepared component A was cooled to 40° C., removed from the masticator and stored for 3 months in a container whilst preventing the entry of moisture.

Component B was also prepared by mixing and was also stored for 3 months in a container whilst preventing the entry of moisture.

After this storage time the two components were combined into a sealant formulation. To simulate the conditions in a twin-screw extruder, components A and B were mixed for 5 minutes and at 50° C. in a cam masticator. The sealant obtained was then immediately extruded to a profile at 60° C. As described hereinbefore, glass test pieces were produced. The results obtained during the investigation of the glass adhesion are compared in the following table 8 with the results obtained for the formulation according to example 1.

TABLE 8

| Characteristic | Example 1 | Example 9 |
|---|---|---|
| Tensile strength of glass-glass bond (N $cm^{-2}$) | 99 k | 96 k |
| Elongation at break (%) | 94 | 98 |
| Tensile strength after weathering (N $cm^{-2}$) | | |
| 1000 h water + UV | 91 k | 94 k |
| 2 weeks at 60° C. and 100% relative humidity | 104 k | 105 k |

k = cohesive breaking behaviour

Table 8 clearly shows that the intermediate storage of the previously prepared components A and B had no influence on the sealant characteristics.

We claim:

1. A process for preparing an epoxidized rubber-based sealant and adhesive composition comprising: masticating 20 to 80% by weight expoxidized natural rubber, adding 5 to 30% by weight of at least on further epoxy resin miscible with the epoxidized natural rubber to make a resin mixture, and adding a polyamine or polymercaptan carrying trialkoxysilyl groups as a crosslinking agent into the resin mixture by masticating at a temperature no higher than about 40° C.

2. A process of claim 1 wherein the sealant and adhesive composition comprises 30 to 60% by weight of epoxidized natural rubber.

3. A process of claim 1 wherein 10 to 75% of the double bonds present in the epoxidized natural rubber are epoxidized.

4. A process of claim 3 wherein 20 to 60% of the double bonds present in the epoxidized natural rubber are epoxidized.

5. A process of claim 1 wherein the further epoxy compound is chosen from the bisphenol diglycidyl ethers of Formula II:

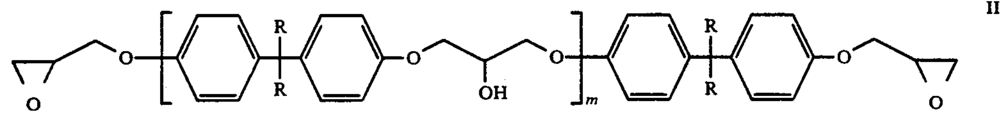

in which R is a hydrogen atom or a methyl group and m is an integer from 0 to 5.

6. A process of claim 1 wherein the further epoxy compound is a novolak resin of Formula III:

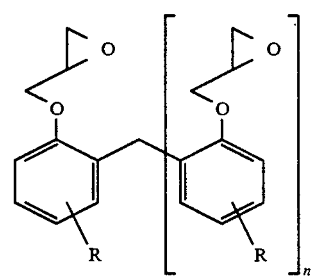

in which R is a hydrogen atom or a methyl group and n is an integer from 1 to 4.

7. A process of claim 1 wherein the polyamine or polymercaptan crosslinking agent is a polyamine of Formula IVa:

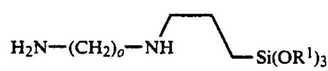

in which each $R^1$ independently is a $C_1$ to $C_4$-alkyl radical and o is an integer from 2 to 6.

8. A process of claim 1 wherein the polyamine or polymercaptan crosslinking agent is a polyamine of Formula IVb:

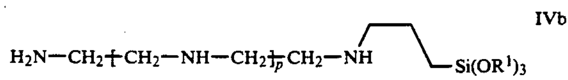

in which each $R^1$ independently is a $C_1$ to $C_4$-alkyl radical and p is 1 or 2.

9. A process of claim 1 wherein the polyamine or polymercaptan crosslinking agent is a polyamine of Formula IVc:

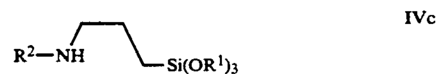

in which each $R^1$ independently is a $C_1$ to $C_4$-alkyl radical and $R^2$ is a polyamino amide unit having 1 to 2 amino groups.

10. A process of claim 1 wherein the polyamine or polymercaptan crosslinking agent is a polymercaptan of Formula V:

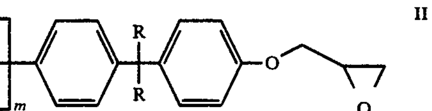

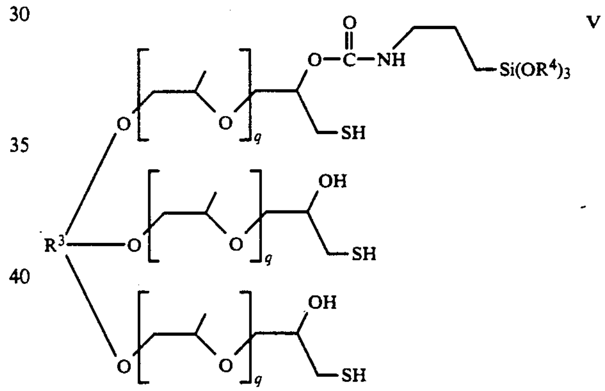

in which each $R^1$ independently is a $C_1$ to $C_4$-alkyl radical, $R^3$ is an aliphatic hydrocarbon radical, and q is 1 or 2.

11. A process of claim 1 wherein the sealant and adhesive composition is characterized by two separate inhibited components, where one component comprises the epoxidized natural rubber and the further epoxy compound and the other component comprises the crosslinking agent.

* * * * *